United States Patent [19]
Emaldi

[11] 3,736,450
[45] May 29, 1973

[54] UNIPOLAR DOUBLE INDUCTOR DYNAMO

[76] Inventor: Raffaello Emaldi, Via Arduino 25, 10134 Turin, Italy

[22] Filed: Nov. 17, 1971

[21] Appl. No.: 199,467

[52] U.S. Cl................................................310/178
[51] Int. Cl.................................................H02k 31/00
[58] Field of Search..................310/178, 269, 67; 322/48

[56] References Cited

UNITED STATES PATENTS

| | | | |
|---|---|---|---|
| 959,959 | 5/1910 | Noeggerth | 310/178 |
| 3,308,318 | 3/1967 | Dunaiski | 310/67 |
| 1,916,256 | 7/1933 | Chandeysson | 310/178 |
| 2,914,688 | 11/1959 | Matthews | 310/178 |
| 3,017,562 | 1/1962 | Duane | 310/178 |
| 3,293,470 | 12/1966 | Polgreen | 310/178 |

FOREIGN PATENTS OR APPLICATIONS

| | | | |
|---|---|---|---|
| 793,854 | 4/1958 | Great Britain | 310/178 |
| 1,256,238 | 2/1961 | France | 310/178 |

*Primary Examiner*—R. Skudy
*Attorney*—Ernest A. Greenside

[57] ABSTRACT

A unipolar double inductor dynamo having an anti-inductor winding for eliminating the axial flux produced by the inductor windings in an armature or stator by generating a high anti-inductor flux and consequently a high saturation in the magnetic circuit of the anti-inductor, the inductor and anti-inductor rotating in opposite directions.

3 Claims, 5 Drawing Figures

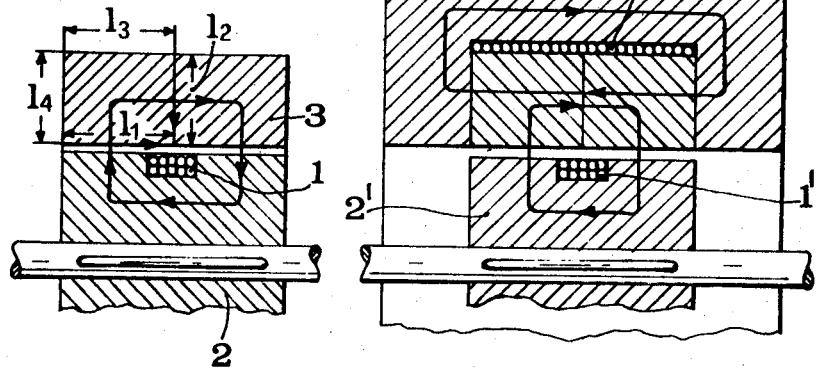
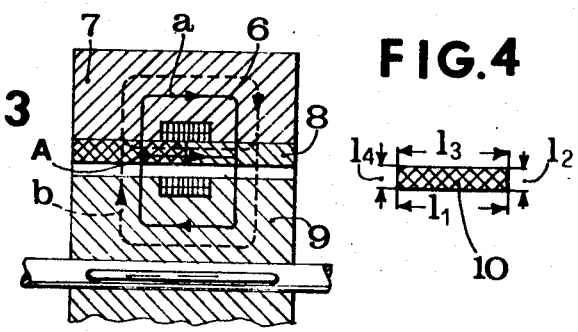
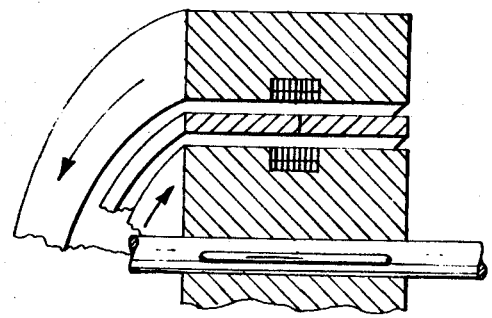

UNIPOLAR DOUBLE INDUCTOR DYNAMO

This invention relates to an unipolar double inductor dynamo.

Acyclic dynamos, also called unipolar dynamos because the conductors of the armature always rotate in a magnetic flux of the same polarity, produce direct current without requiring a commutator. Unipolar dynamos presently available have limited practical application because the voltages they produce are too low. To produce higher voltages it is necessary to incorporate series connections using rings and brushes and this entails undesirable losses due to friction between the rings and brushes and voltage drops.

Accordingly, unipolar dynamos have hitherto been used for low voltage applications (for example, for electrolysis).

One reason for the low voltage output of unipolar dynamos is that it has not been impossible to combine, without losses due to an axial flux component the individual induced electromotive forces generated in the conductors of the armature.

An an object of this invention is to eliminate this drawback. For this purpose the invention provides a unipolar dynamo with double inductor, having an anti-inductor winding for eliminating the axial flux component produced by the inductor winding in the armature, or stator, by generating a high anti-inductor flux and consequently a high saturation in the magnetic circuit of the anti-inductor, the inductor and anti-inductor rotating in opposite directions.

Some preferred embodiments of the invention will now be described by way of example and with reference to the accompanying drawing, in which:

FIG. 1 is a diagrammatic partial longitudinal section through a unipolar dynamo of the conventional type;

FIG. 2 is a similar diagrammatic partial longitudinal section through a unipolar dynamo according to the present invention, and FIGS. 3 to 5 show improvements in the unipolar dynamo of the present invention.

FIG. 1 schematically illustrates a prior art unipolar dynamo for the express purpose of showing why it is not feasible to produce with such unipolar dynamo higher voltages values which can be obtained with known collector dynamos, for example, exemplified by U.S. Pat. No. 3,308,318.

In FIG. 1 the inductor winding is indicated by 1. Assuming that a winding turn has four sides $1_1$, $1_2$, $1_3$ and $1_4$ (the same applying to the other winding turns), the flux lines of the rotor 2 close through the stator 3 and thereby generate an electromotive force $e_1$ in the section $1_1$ of the winding turn and in the section $1_2$ induces an electromotive force $e_2$ opposed to the force $e_1$ whereas in the sections $1_3$ and $1_4$ no induced electromotive force is generated.

If the electromotive force $e_2$ could be eliminated, (assuming that throughout the interior of the stator conductors are located in channels extending in the same direction as $1_1$ of FIG. 1), it would then be possible to combine all the individual electromotive forces $e_1$ induced in said conductors. According to the invention illustrated in FIG. 2 for eliminating the flux through the section $1_2$, a winding 5 is provided, which hereinafter will be referred to as an "anti-inductor winding" and for neutralizing the axial component of the flux produced by the inductor winding 1' in the armature 2'. The arrangement of FIG. 2 however requires a great amount of material (copper and iron) so that, as only about 25 percent of the inductor winding performs useful work, the length of the dynamo is doubled and its overall diameter is increased by 50 percent over the length and diameter of presently available unipolar dynamas.

I have now ascertained that conventional unipolar dynamos can be improved by eliminating the axial component of the inductor flux in the center of the armature as illustrated in FIG. 3.

In FIG. 3 the anti-inductor winding is indicated by 6, 7 indicates the anti-inductor, 8 the armature, and 9 the inductor. 10 (FIG. 4) indicates the winding turn which is given a very flat shape.

This embodiment is much more advantageous as the overall diameter of the dynamo is only a little larger than conventional unipolar dynamos while the useful portion of the induced winding amounts to more than 45 percent since the end portions or sections $1_2$ and $1_4$ are very small in relation to the sections $1_1$ and $1_2$.

For purpose of explanation the effect of the inductor flux $a$ will be considered in the absence of the inductor winding 6. When this flux a reaches the position A in the armature it may complete its circuit along two different paths, i.e. through the anti-inductor 7 or the armature 8. Since the cross section of the armature 8 is very small, the major portion of the flux of the inductor 9 will more readily pass through the anti-inductor 7 and produce an induced electromotive force in the section $1_1$. In the section $1_2$ there would likewise be produced an electromotive force $e_2$ opposed to the force $e_1$, but would be very small since the length of the section $1_2$ is very small.

To prevent production of the electromotive force $e_2$, before energizing the inductor winding, an anti-inductor flux b (FIG. 3) sufficiently strong should first be produced to cause a high degree of saturation in the magnetic circuit of the anti-inductor. The anti-inductor flux $b$ produced by the anti-inductor winding 6 will close through the inductor 9 which, being of the same size as anti-inductor 7, will also be highly saturated by this flux (only a minimum portion of the anti-inductor flux will close through the armature) for the same reasons stated with respect to flux $a$. Thereafter the inductor winding is energized by rotating the rotor. Upon commencement of rotation of the rotor. an electromotive force will be produced in the inductor winding which creates a magnetic flux directed in an axial direction (as in the conventional unipolar dynamos), but will not present problems as this force is very small. Obviously if the rotor is stationary no difficulty whatsoever will be experienced.

As the current in the inductor winding increases however, with the high degree of saturation in the magnetic circuit of the anti-inductor as previously described, a small percentage of the flux produced by the inductor winding will close through the anti-inductor so that only a small electromotive force opposed to the electromotive force $e_1$ will be generated in the section $1_2$. Under these conditions the major portion of the rotor flux closes through the armature (where there is no saturation) and simultaneously the anti-inductor flux (which meets with increasing resistance in passing through the rotor due to the simultaneous presence of the inductor flux flowing in the same direction) will pass through the armature in a direction to eliminate the rotor flux therein, this process continuing until the maximum rotor flux is generated which is equal to the anti-inductor flux.

To obtain a 90 percent utilization of the inductor winding the embodiment of FIG. 5 may be employed. Thus, to ensure that the electromotive force generated in the section $1_4$ of the winding turn will correspond to the direction of the electromotive force $e_1$ and that the two fluxes in the rotor are opposed to each other, the inductor and anti-inductor rotate in opposite directions.

To achieve this object many mechanical solutions may be adopted which are not shown. Also the details of construction and the arrangement of the various members may be different from what has been described and shown to meet various practical requirements without departing from the scope of the invention.

I claim:

1. A unipolar dynamo comprising a rotatably mounted shaft, an inductor secured to said shaft for rotation therewith and having an outer peripheral face extending along and surrounding said shaft, an anti-inductor having an inner face spaced from and peripherally surrounding said inductor outer peripheral face, a first plurality of inductor windings in at least a portion of said outer peripheral face of said inductor and extending circumferentially thereabout, a second plurality of anti-inductor windings in at least a portion of said inner peripheral face of said anti-inductor and extending circumferentially thereabout, and an armature between said first and second plurality of wires and being carried by said inner face of said anti-inductor spaced from said inductor outer face.

2. A dynamo according to claim 1, wherein said first and second plurality of windings have substantially equal overall axial extent and being disposed in relation to one another in substantial radial alignment.

3. A dynamo according to claim 2, wherein said inductor and anti-inductor are rotated in opposite directions.

* * * * *